(12) United States Patent
Weinmann (10) Patent No.: US 7,097,791 B2
(45) Date of Patent: Aug. 29, 2006

(54) METHOD OF CONTROLLING/REGULATING AN EMBOSSING PROCEDURE AND DRIVE CONTROL DEVICE FOR INJECTION MOLDING MACHINES

(75) Inventor: Robert Weinmann, Weesen (CH)

(73) Assignee: Netstal Maschinen AG, Nafels (CH)

( * ) Notice: Subject to any disclaimer, the term of this patent is extended or adjusted under 35 U.S.C. 154(b) by 231 days.

(21) Appl. No.: 10/203,275

(22) PCT Filed: Feb. 9, 2001

(86) PCT No.: PCT/CH01/00090

§ 371 (c)(1),
(2), (4) Date: Oct. 11, 2002

(87) PCT Pub. No.: WO01/58662

PCT Pub. Date: Aug. 16, 2001

(65) Prior Publication Data

US 2003/0047827 A1    Mar. 13, 2003

(30) Foreign Application Priority Data

Feb. 9, 2000 (WO) .............................. CH00/00069
Dec. 22, 2000 (CH) .................................... 2532/00

(51) Int. Cl.
*B29C 45/56* (2006.01)

(52) U.S. Cl. ................. 264/40.5; 264/1.33; 264/328.7; 425/150; 425/590; 425/810

(58) Field of Classification Search ............... 264/40.5, 264/1.33, 328.7; 425/810, 150, 590, 451.2
See application file for complete search history.

(56) References Cited

U.S. PATENT DOCUMENTS 3,736,087 A * 5/1973 Ruegg ..................... 425/451.5
4,832,884 A   5/1989 Speck et al.
4,917,840 A   4/1990 Harada et al.
5,069,613 A * 12/1991 Inaba et al. .................. 425/150
5,279,778 A *  1/1994 Taira et al. ................. 264/40.1
5,820,797 A * 10/1998 Hehl .......................... 264/40.5
5,843,496 A * 12/1998 Ito et al. ..................... 425/589
5,906,777 A *  5/1999 Kamiguchi et al. ......... 264/40.1
5,945,047 A *  8/1999 Yukihiro et al. ........... 264/40.5

FOREIGN PATENT DOCUMENTS

| AT | 365 119 | 12/1981 |
| DE | 36 31 164 A1 | 6/1987 |
| EP | 0 244 783 B1 | 11/1987 |
| EP | 0 359 830 A1 | 3/1990 |
| EP | 0 426 129 A2 | 5/1991 |
| GB | 1 226 118 | 3/1971 |
| GB | 2 193 681 A | 2/1988 |
| WO | WO 00/47389 | 8/2000 |

* cited by examiner

*Primary Examiner*—Jill L. Heitbrink
(74) *Attorney, Agent, or Firm*—Finnegan, Farabow, Garret & Dunner, LLP (57) ABSTRACT

The invention relates to a novel method for producing precision parts, especially flat optical data carriers. According to the inventive method, the embossing procedure is program-controlled on the basis of the path function of an electromechanical or hydraulic drive of the driven mold half. When a servomotor is used, the internal path signal thereof can be directly used for calculating the path function or for operating the program control. The novel method allows for a complete speed control of the embossing phase. All factors that can be mechanically influenced from the exterior are detected in more detail for the conditions before and during the embossing phase, thereby allowing for an optimum precision and reproducibility.

25 Claims, 10 Drawing Sheets

METHOD OF CONTROLLING/REGULATING AN EMBOSSING PROCEDURE AND DRIVE CONTROL DEVICE FOR INJECTION MOLDING MACHINES

TECHNICAL SCOPE

The invention relates to a method of controlling/regulating the embossing procedure for producing precision parts, especially flat optical data carriers, with an injection moulding machine with two mould halves: a driven mould half and a counter-mould half whereby the driven mould half is moved with the help of an electromechanical hydraulic embossing drive and the connection between the driven mould half and the counter-mould half is brought about during the basic setting of the injection molding machine and during the entire injection cycle with the help of columns of the injection moulding machine. The invention further pertains to a drive and controlling/regulating device for the mould-closing side of an electro-mechanically and/or hydraulically driven injection moulding machine with a driven mould half and a counter-mould half with controllable/regulatable embossing procedure for producing precision parts, particularly flat data carriers, whereby the connection between the driven mould half and the counter mould half can be brought about with the help of columns of the injection moulding machine.

STATE-OF-THE-ART TECHNOLOGY

Classical injection moulding machine~ basically have two mould halves. The movable, first mould half is moved by means of a drive system against a drive carrier plate for mould closing as well as mould opening. The mould movement can be controlled, for example, on the basis of a path function, a pressure function and/or a speed function. The document GB-PS 1 226 118 suggests controlling of the speed sequence of the mould movement for definite section of a moulding cycle according to pre-given programmes. If hydraulic cylinders are used as drive system, then the speed of the movable mould half can be controlled and/or regulated by the oil quantity. Thus, with additional temperature parameters, an optimum speed sequence of the movable mould half can be ensured with high precision. In case of classical injection moulding, both the mould halves are pressed together with such a great closing force, that even under the highest pressure of the molten mass the moulds will not open. Typical in the case of classical injection moulding is a rather long sustained post-pressure phase after conclusion of complete mould filling. The post-pressure-phase is maintained by the injection screw over the initial casting in the sense of hydraulic pressure. For the species of injection moulding machines for producing flat data carriers, the focus is on embossing of data information. Especially for production of optical data carriers or CDs, the following special phases of the production cycle are distinguished:
  mould filling
  embossing of data information
  post-pressure in the cooling phase for obtaining the surface structure, even on shrinkage of the injection mould part.

In classical injection moulding, with the exact cavity in the injection mould, the finished injection mould part is definitely produced. In contrast, in case of injection moulding machines for embossing, the final shape of the product is achieved only by impact of both mould halves together after initially only part-filling of the mould hollow space.

The embossing phase is the key phase in production of flat data carriers. Typical for the embossing phase is a completely flatly effective post-pressure by application of a compression pressure directly over the mould halves, for which a driven mould half is pushed against the counter-mould half. By the term post-pressure, one understands a flatly applied force through the one mould half The post-pressure is the logical substitute for the "hydraulic" post-pressing by means of pressure transmission over the fluid blow, which. in the case of classical injection moulding acts through the~ injection nozzle point-wise in the mould. The driven mould half is brought to a pre-determined position before injection for producing flat data carriers and retained in this position for the duration of injection. Thereafter, by applying the compression pressure, the corresponding blank or the driven first mould half is impacted against the second counter-mould half by applying embossing pressure.

A method for step-wise shaping of lenses and flat data carriers made of plasticized thermoplastic resin, by using an injection moulding machine, is suggested in the document EP 0 244783:

As a first step, a pre-enlarged, closed mould hollow space is formed, which is suitable for taking up the-plasticized resin, without any occurrence of a noteworthy counter-pressure and having a volume which is greater than maximum volume taken up by the plasticized resin meant for injection under normal pressure In the pre-enlarged mould hollow space, thereafter a volume of the platicized resin is injected which is lesser in volume than that of the object to be moulded.

A controlled force is applied by the machine in such a way that the volume of the mould hollow space gets reduced, whereby the resin present therein gets distributed afresh and the applied force is retained thereafter, at least till solidification of the resin, whereby it gets compressed in the mould hollow space.

The compression step is however introduced already before the injection step is completed.

The newer document U.S. Pat. No. 4,917,840 suggests for production of flat precision parts like "Recording Disc" the following three steps:

that a speed-controlled movement of the first blank takes place only after injection of the synthetic material for a definite slot size; and that a speed/velocity programme, with respect to the successive slot of the first tool half relative to the second tool half is defined;

and/or with respect to the successive time intervals, the movement of the first tool half is defined.

Thus we have successively: first, an exact pre-determined slot size which is pre-given, secondly the fluid synthetic material is injected in closes and thirdly embossing is carried out with a pre-given speed programme. The sub-steps for the process of the speed programme can take place either according to definite slot positions or time intervals, whereby it is foreseen that additional individual sections, particularly at the end of the embossing stage, are ensured pressure-controlled. The prerequisite for these suggestions is an exact slot measurement. The quality of the entire controlling/regulating is therefore dependent on the precision of the momentary slot measurement or a corresponding evaluation in real time. A slot measurement between the matrixes would be cumbersome, so that in practice a substitute mass, e.g. a distance measurement between the mould carrier plates is undertaken, as suggested in the document U.S. Pat. No. 4,917,840. An embossing regulation built up on the continuously measured slot between both mould halves contains only the phase of reduction of the slot or the phase of material distribution, however not the phase of force building during instancing. This solution therefore conditions an additional force measurement in "real time" to the exact controlling/regulating of the embossing procedure.

Therefore, according to the suggestion of the newer published document, the speed-controlled movement can only begin after start-up to an exactly defined position or at a defined slot. The solution according to U.S. Pat. No. 4,917,840 sets high claims on the sensor technology with the allied possibilities of error.

PRESENTATION OF THE INVENTION

It is the task of this invention to develop a method and a device with a process control for embossing procedure, which would ensure a high degree of precision and responsibility of the end product and can be operated with a minimum of sensor technology.

The method as per the invention has the special feature, that the controlling/regulating of the embossing process~ takes place on the basis of the path function of the driven mould half in a programme-controlled/regulated manner.

The drive and control device as per the invention has the special feature, that an embossing drive and a programme control are foreseen, through which the embossing process is controllable/regulatable on the basis of the path function of the driven mould half.

It has been recognised by the inventor that the time-of beginning of embossing is not primarily decisive for the quality of the finished injunction mould part. Much more important for the product properties is the type of embossing process, with optimum mass distribution in the cavity and the subsequent compression building. In both the mentioned solutions as per the state-of-the-art technology for production of flat precision parts, efforts are made, by section-wise consideration of the applied force or the resulting pressure therefrom in the control/regulation of the embossing phase, to avoid great variations from the target parameters. The document EP 0 244 783 also wants to retain the force applied for embossing at least up to the solidification of the resin.

In an injection moulding machine, the compression forces are retained with the help of frames or columns and correspondingly a force-locking is generated. With the enormous forces required for embossing, there is a machine expansion to the tune of 0.5 mm to 1 mm and more. The thickness of data carriers is between 0.4 to 0.8 mm. While using the maximum forces during the embossing stage on the movable first mould half or on the driven plate, the second mould half moves with the counter-plate around the mass of the machine expansion, which could be greater than the thickness of the data carriers.

The new invention proposes to reduce the controlling/regulating for the embossing process:
 1. On the basis of the path function of the driven plate or the driven mould half, and
 2. to a programmed control/regulation.

Injection moulding machines have means for basic setting of the machine. For this, refer to the document DE 36 31164. After each mould change, before beginning the first injection cycle, the machine is pre-set. On the basis of the maximum embossing force, the basic closing force is set. For example, by means of a column nut drive the movable parts are positioned in such a way, that the pressure on the tool during basic setting for closed tool (without injector) easily reaches a closing force through the maximum force required for embossing. In case of a toggle drive, these are completely stretched for closed tool. The opening path can be set from case to case. Thus the beginning and end of the movement of the driven plate can be exactly defined.

The new invention elegantly circumvents, for controlling/regulating the embossing process, the problem of continuous measurement of the machine expansion or the slot between the mould halves. Both are dependent on the continuously changing embossing force. The new invention further allows, that during the phase of the embossing process, with respect to the regulating technology, similarly also for dispensing with the corresponding sensor and evaluation technology for the embossing force sequence. As explained in details below, the most important variations in the extreme case can be corrected from cycle to cycle by means of a central column nut regulation and can thus be taken into account by the programme control/regulation. As a big advantage, this reduces the complications of expensive "real time" sensor technology during the embossing phase. One can drop the correspondingly complex regulating technology. The new solution allows for consideration of most important varying parameters, particularly the temperature factor which has an influence on the distance ratios, cyclically-through the programme sequence. With respect to the compression, this firstly refers to all possible deformations including column expansion. The path function includes the special, concrete drive agents. The beginning and the end of the embossing programme sequence is defined as per the new solution already in the basic setting of the machine. Thus, for normal injection operation, in the most critical phase of embossing, one can do without special "real time" sensor and regulating technology. This enables, through selectable programmes, controlling of the entire embossing process on the basis of the path function of the electromechanical drives.

The invention allows for an entire range of particularly advantageous extensions, for which reference may be made to in the claims. As the best solution at the moment, the new solution can be used in generic injection moulding machines, as it has been described in the document WO 00/47389 of the applicant. It pertains to a machine with a so-called long stroke and a short stroke. The short stroke is sufficient to remove the CDs automatically from the opened moulds with grippers. The long stroke primarily serves the purpose of stamper changing.

The market demands CDs with multiple different basic structures and an unrestricted number of variations with respect to the special data to be embossed. The individual CDs are as a rule small, but could also-go into thousands and ten thousands. The unusually, rapid changing of mould inserts calls for a special genre of injection moulding machine. Sometimes a mould or the corresponding stamper is in the machine only for a quarter or half of an hour and has to be replaced by another one. Apart from a defect-free production, the economic viability lies primarily in two almost equally important factors:
 1. Cycle time for a CD including the required dry run time.
 2. Retooling time for inserting the stamper in the basic mould for changing the information.

The retooling time strongly eats into the productivity owing to the small series, as the stampers have to be often changed several times per hour. Stampers, viewed from a distance, are kind of thin CD-plates, which as negative mould have the image of the surface structure of the CD.

Thus only the stamper plate is changed, which can be inserted into the mould and, for example, again be taken out in half a minute.

The path function is taken as the basis of profile control/regulation in the first phase of reduction of embossing-slot or material distribution as well as in the second phase of increase in embossing force. The reduction of the embossing slot and increase in embossing force preferably takes plate speed-regulated, whereby the phase of reduction of the embossing slot and the subsequent phase of increase in force is carried out with the help of speed regulation, preferably flowing into one another. The embossing end is fixed by a pre-selectable path position of the embossing drive or a driven mould half, which corresponds to a pre-settable closing force and an optimum force in the embossing end phase. The pre-setting of the machine or the corresponding correction regulation by the central column nut adjustment is selected in such a way, that during production, in the embossing phase as well as in the subsequent post-pressure, all forces are taken up through the mass of the injection moulding part and any metallic contact of the mould-/tool halves is avoided.

According to a further, very advantageous extension of the new solution, the post-pressure sequence takes place programme-controlled/regulated as profile control/regulation of the .position or the path, either through time basis, the force. above the time basis or the torque of the drive over the time basis, in such a way that the surface structure can be best retained and the effective post-pressure during the cooling phase is reduced in such a way, that the inner stress condition of the injection moulding parts and hence the refractive index is not negatively influenced as far as possible. For the post-pressure sequence, the controlling/regulating takes place on the time basis, in order to justify the temporal function of cooling and hence to ensure the required inner structure in the finished part on cooling. Depending on the application, the profile control can take place over the path of the force, the torque of the driving motor, or a combination.

Before a production charge, particularly after each tool change, a basic setting of the machine is taken up or monitored during each injection cycle and, if required, cyclically corrected. Corresponding to the maximum embossing force in the embossing process, in a known method, the basic locking force and the optimum end and beginning position of the embossing drive without the product and with completely closed tool, is fixed. Ideally, for each production cycle, the peak value of the occurred actual embossing force is determined and corresponding length changes of the bonding agent caused by thermal influences is determined, preferably by comparison of the average value of several measurements with the rated embossing force and compensated by correction of a column nut setting. The basic setting for an optimum end position and the brig stroke are undertaken through a column nut adjustment, preferably electro-mechanically or electro-motorically. The path determination for the long stroke or inspection stroke can take place by path determination in a servo motor, whereby the position of the production point determined in the locking force regulation can again be exactly driven in a subsequent cycle and can be taken as a basis as reproducible position of the controlling/regulation or the coordination of the different axes of the injection moulding machine. A not unimportant point is, that the clearance to the movable parts, particularly the column nut drive, is removed by mechanical or pneumatic spring agents effectively by pressing in embossing force direction. In case of a hydraulic drive, the path determination is ensured by corresponding path sensors.

According to a further, very advantageous extension, the short stroke and hence also the embossing drive takes place electro-mechanically through a servomotor, with position identification in the servomotor, on the basis of which the path function of the electromechanical drive can be calculated. The short stroke or embossing drive can have a toggle drive, a rack-and-pinion drive, an eccentric drive or a crank drive, which is connected to the driven mould half.

If the embossing drive is designed as eccentric or crank drive, then the eccentric or crank drive is designed in such-a way, that the embossing stroke can be utilised for the maximum compression in the proximity of the dead centre and the path function can be derived from the crank position or eccentric position (q) and accordingly the position identification can be determined from the regulation of the servomotor.

Ideally, the drive carrier plate is joined fixed to the machine stand and the driven mould half is guided movable over the embossing drive relative to the drive carrier plate in such a way, that the reaction forces from the acceleration and retardation of the mould movements can be taken up by the machine stand and hence not negatively influence the precision, particularly the embossing stat position.

Advantageously, the drive- and control-/regulating device has a central column nut drive~ whereby a counter-plate with the counter-mould half is placed shiftable against the machine stand, and the basic setting of the machine can be carried out through the column drive. Thereby the column nut drive is designed as setting member of the locking force basic setting and the locking force-regulation along with a force sensor is designed as actual value giver for determining the locking force and a regulating device. The embossing drive and the central column nut drive have at least one independently controllable drive motor each, preferably designed as servomotor, whereby the controlling/regulating device can be connected to the data buses with the required storage capacity for selectable recipes or programmes.

SHORT DESCRIPTION OF THE INVENTION

The new invention is described below on the basis of a few design examples with further details. The following are shown:

FIGS. 8a to 8d the various processes of mould movement, depicted as function over time: FIG. 8a the mould position, FIG. 8b the embossing force, FIG. 8c the slot S and FIG. 8d the screw movement;

WAYS AND EXECUTION OF THE INVENTION

Figure 1:
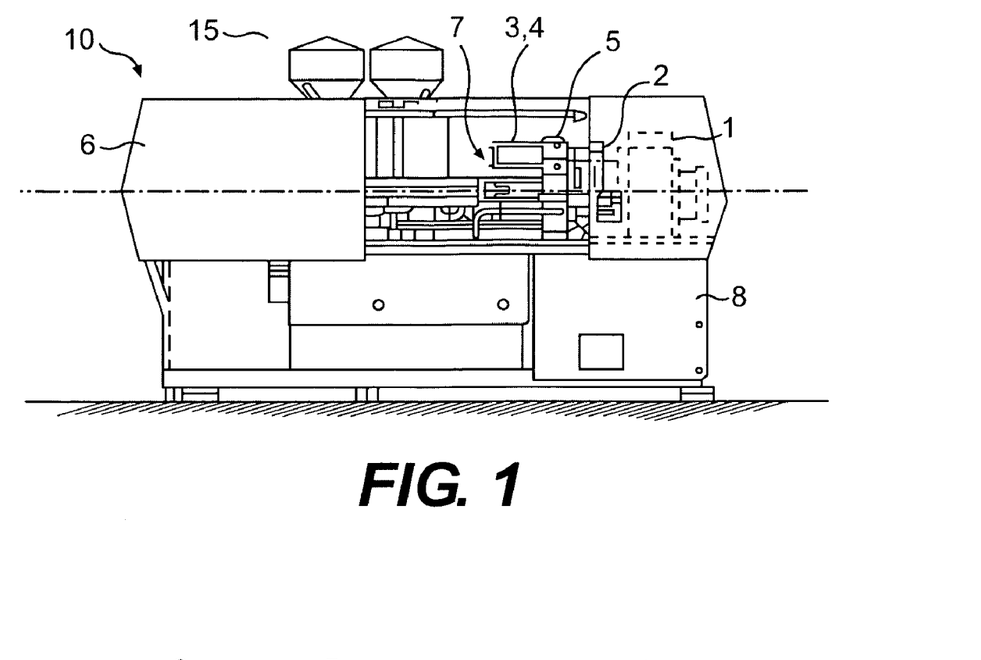
FIG. 1 An injection moulding machine of the state-of-the-art technology for production of, for example, CDs with hydraulic drive.
Figure 2:
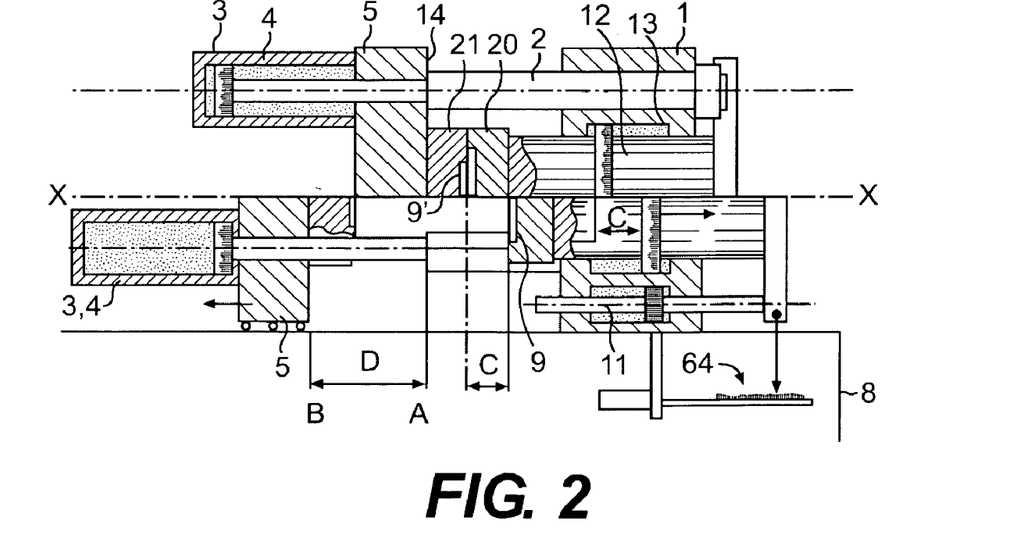
FIG. 2 Schematically in enlarged scale, the hydraulic drive for the short stroke and long stroke, corresponding to FIG. 1, with a path determination for the embossing phase as per the new solution.

With the known solution as per FIG. 1, in the state-of-the-art technology, a CD is produced in 3.7 sec or less. It relates to a machine concept of the applicant. It is a completely hydraulic machine 10 with very good properties with respect to machine stability. The characteristic feature of the machine 10 is a combination of a short stroke and a long stroke. The short stroke (C in FIG. 2) lies between 70 to 80 mm. The closing force is approx. 600 kN. The maintenance stroke (D) lies approx. at a total of 300 mm. A mould plate 1 is joined fixed to a machine stand 8 or machine bed. The draw bars 2 are screwed -with the mould plate 1, whereby at the other end of the draw bars 2 there is a piston head 3 within a cylinder 4. The mould-plate 5 is drawn above the axes X—X in a production position, whereby the piston head 3 may continuously press against a shoulder 14 of the draw rods 2. With relatively small forces, a closing piston 12 moves with two auxiliary cylinders 11 forwards and backwards over the entire short stroke (C). Only for applying the great closing force, the corresponding oil pressure is applied in a piston chamber 13. For changing the stampers 9, 9 in the mould, the piston 3 is moved from position A to B in order to create sufficient space for a mould changing. With the shown solution, for applying the closing force, only a small quantity of oil is required. For a stamper change in the mould halves 20, 21, the three cylinders are brought on to the draw rods 2 and the mould plate opens around the long stroke or maintenance stroke (D). Below, left, the short stroke is shown with open mould. The machine 10 is shown in FIG. 1 with open protection door 6, with view on to the mould closing (right in the picture) and the injection cylinder 7 (left in the picture). The raw material is fed through the filling container 15 to the machine 10, heated over the injection cylinder 7 and injected in doses under pressure into the cavities of the moulds. FIG. 2 shows for the hydraulic components the solution of FIG. 1. FIG. 2 is however equipped with a path measuring system 64 according to a new solution. FIG. 2 schematically shows that also a hydraulically driven machine can be controlled/regulated by the path function.

Figure 3:
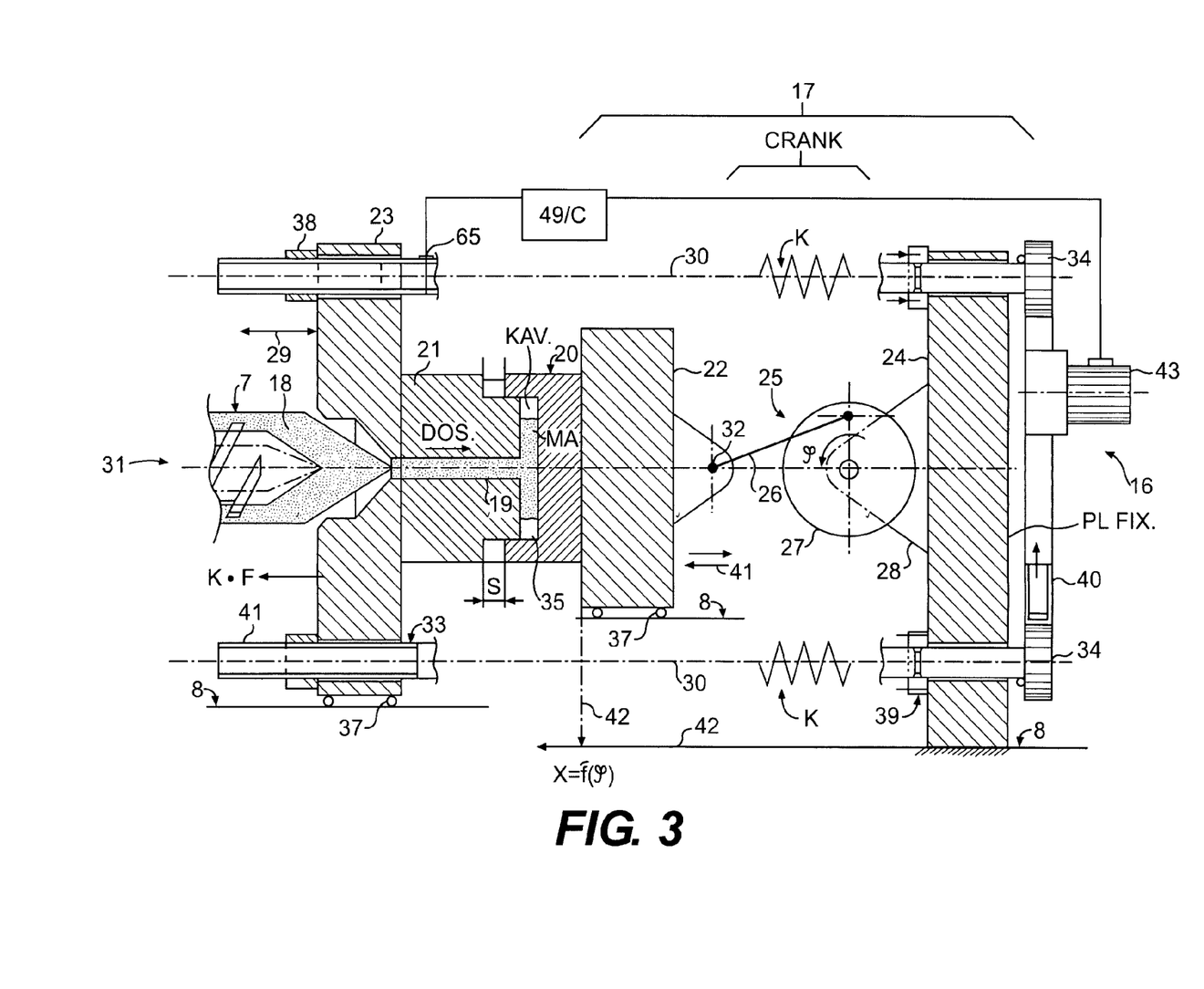
FIG. 3 A design example as per the new solution with crank drive and column nut drive with electro-mechanical drive.

FIG. 3 shows an example of a new solution. On the left picture side of FIG. 3 there is the nozzle-sided tool clamping plate or long stroke carrier plate 23 with a counter-mould half 21 on to which, according to -arrows 31, the injection cylinder 7 is moved to and fro. The long stroke carrier plate 23 can, depending on the selected concept, be arranged movable or fixed on to the machine stand 8; accordingly, the drive carrier plate should also be arranged fixed or movable. On the right side of the picture, as a preferred solution one can see a compact component 17 with a crank drive 25. The component 17 consists of a drive carrier plate 24 and a movable tool clamping plate 22, which lies. Movable on a guide-groove on the machine bed, as well as a crank carrying structure. A crank drive 25 is, on the one hand, placed over a pin 32 in the movable tool clamping plate 22 and, on the other hand, hinged over a crank or an eccentric in the crank carrier structure 28, in such a way that the crank rod 26 can execute the crank movement corresponding to the eccentricity. The eccentricity (e, FIG. 11) corresponds to half the stroke height. On the opposite side of the movable tool clamping plate 22, there is the driven mould half 20.-With both the mould halves 21 and 20, in the closed condition, one obtains the hollow space 35 for inserting the desired disc-shaped stampers 9, 9 (FIG. 2). Usually the CD is not directly cast into the hollow space 35. In the hollow space, a stamper 9, 9 is inserted on one or both sides, which as negative mould has the cavity for the flat data carrier to be produced. The anchoring force and retention force between both plates is ensured by means of bond, gents, especially by three or, if required, four columns 30. Each column 30 is anchored on the nozzle-side tool clamping plate or long stroke carrier plate -23 by a nut 38. On the drive carrier plate 24, a rotatable flange 39 is fixed, which grips on to a ring gear 40. The fixed nut 38 grips through an inner thread on to the thread 33 of each column. A rotatory movement of ring gear 40 or the toothed pinion 34, by rotation of the columns 30 on the nut 38 and the thread 33 of each column 30, is converted into a linear movement (arrow 29) of the nozzle-side tool clamping plate or the long stroke carrier plate 23. This movement depicts the long stroke or maintenance stroke and is required for quick stamper changing or for basic setting and a cyclic correction of the same. The short working stroke, on the other hand, is effected by, the crank drive 25 and the movable tool clamping plate 22. FIG. 3 further shows partly schematically, the basic concept for the new solution for producing flat data carriers like say compact discs. The position during transition from the injection phase into the embossing phase is shown. At the centre of both mould halves is a cavity Kay, which however defines the external shape of the data carrier only at the end of the embossing phase.

During the course of development of the production process various concepts were pursued. Of unchanged relevance is the fact, that for the highest requirement, a quantity of the injection mass is injected into the doses, into the cavity, however only that much, so that the-cavity is only partly filled. Before filling, by moving the driven mould half 20 against the counter-mould half 21, a pre-defined compression slot is formed. The quantity of injection mass is designated by Ma. After completion of the mould filling phase for the injection sequence, the actual embossing process is introduced. In the example, as per FIG. 3, for this the driven mould half 20 is further moved in the direction of the cavity Kay and by applying a maximum embossing force the mould hollow space or the cavity is reduced and the injection mass is compressed. In older processes, the compression slot was removed right up to zero. According to the new invention, it has been recognised that the tools cannot be driven up to a stop, that rather a residual slot S should remain for an exact final regulation even after completion of embossing. The sprue is provided with the reference no. 18. FIG. 3 shows a basic scheme with the machine-structural core elements of a machine with central column nut drive 16. Thereby K refers to the spring constant of the column 30, if required with inclusion of the other deformable components, as long as the resulting deformation under a corresponding load influences the distance S between the tool clamping plates 22 or 23. A drive carrier plate 24 is designated by PLfix as fixed. In this design concept, the drive carrier plate 24 is connected fixed to the machine bed 8 or machine stand. A crank drive 25 with crank rod 26 and crank disc 27 over crank carrying structure 28 is attached fixed to the drive carrier plate 24, so that the corresponding retention force or the impact-like forces are guided directly on to the machine bed 8. The crank drive 25 is designed for a short stroke and serves the purpose of applying the embossing force.

Two further important functions are clearly shown in FIG. 3: One is movability of the tool clamping plate 23, symbolically marked with rollers 36 or 37. The tool clamping plate 22 moves with the driven mould half 20 for a short stroke, especially for the entire injection moulding cycle. The path X for the driven mould half 20 is a function of the rotating angle cp of the crank 25 of φ((LX=f [φ]). The movement direction is indicated by the arrow 41 and the path determination by the arrow 42. The second important function is the movability of the tool clamping plate 23 for the long stroke over the column nut drive 16. The tool clamping plate 23 is shiftable for this purpose, shown in the picture as supported on rollers 37.

Both movements for the short stroke and the long stroke are ideally ensured by an electro-motoric drive. The concept foresees, that-the drive carrier plate 24 is joined fixed with the stand 8. In contrast, both the mould halves 21, 22 are placed shiftable related to one another and to the machine stand S. The compression function (K×F) is determined at least primarily on the basis of the column expansion (K) and the effective compression force (F). With the factor K all other deformation factors, e.g. of the various plates can also be determined. For the basic setting the compression force can be calculated in different ways and e.g. in first approximation can be derived from the torque of the drive motor 47. The disadvantage thereby is, that friction factors, just like acceleration forces, falsify the result. Suitable force sensors from the field of moulds are preferred, but one can also used sensors for expansion of the columns 30-for determining the effective compression or the closing force. Here the use of sensors is of great advantage because one has to deal with slow, almost static conditions. A precise calculation is thereby much simpler than during a high-dynamic process like embossing process. The programme control 49 is conceived in such a way, that the control/regulation takes place during absence of a compression, on principle, on a pure path function, as in this case (K=0) for the path function, the factor column expansion is equal to zero.

Ideally the electo-motoric drive takes place by servomotor and the mechanical over drive through a crank drive 95 or an eccentric 61. Thereby, the path function can be derived from the crank position or eccentric position (cp) and can be determined according to the position identification from the regulation of servomotor. As the end of the movement is defined by the basic setting, the real conditions in the cavities of the moulds are defined from the path function of the movable tool clamping plate 22 [f(φ)] and the compression function (K×F) with the highest degree of precision. The driving agents are preferably controlled over several embossing sub-stages according to a pre-given or optimizable speed programme. The crank drive or eccentric drive not only has the enormous advantage, that till almost the dead centre the movement function can be calculated from-the conversion of a circular movement into a linear movement geometrically with highest precision and without additional sensors, can be derived from the position of the rotor in the servomotor. Therefore, in an electromechanical drive, a control/regulation on the basis of the path function can be carried out with high precision. The factor of effective compression, inclusion of temperature parameters, is taken into account in the controlling and regulating process. This -allows, through pre-given programmes, exact controlling of the entire embossing process on the basis of a path function of the electromechanical drive as per job assignment. The beginning and end of the programme sequence are already given in the basic setting and with the corresponding setting corrections (force sensor 65) of the machine. Therefore, for production within the embossing cycle, no further sensors are required. The new solution thus allows that the most important sub-parameters which have an influence on the distance condition, can be taken into account directly in corresponding recipes or programme sections. With regard to the compression, these are primarily all possible deformations, including column expansion. The path function allows inclusion of the special, concrete drive agents.

Figure 4A:
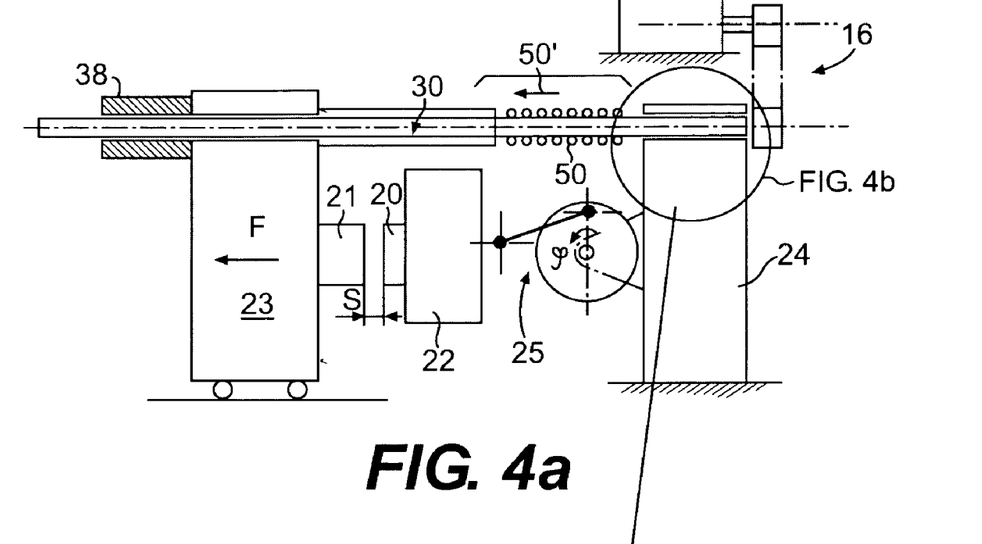
FIG. 4*a* The clearance removal for the column nut drive of a solution as per FIG. 3.

FIG. 4a shows a further, very advantageous design concept for improvement of regulating precision. For this purpose, the mechanical clearance of all relevant, effective, mechanically movable parts, is eliminated by a compression spring 50. It is thereby important that the compression spring 50 acts in the same direction as the force building for embossing (arrow 50).-.-

Figure 4B:
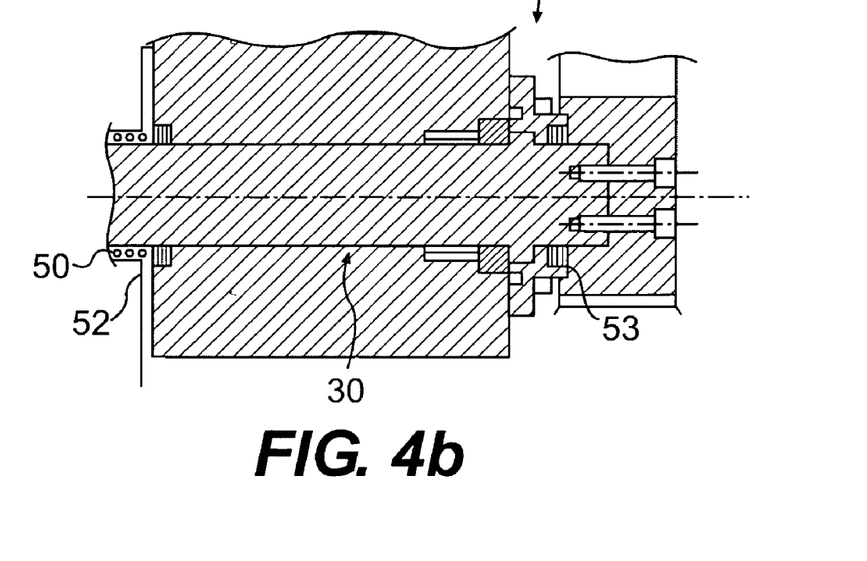
FIG. 4*b* Positioning of a column as sectional enlargement as per FIG. 4*a;*

FIG. 4b shows a section through a support point of a column axis 56. On both outer sides, a seal 52 or 53 is placed. This allows for inclusion of an oil or grease lubrication in the interior for friction-free support, so that here too the requirements for a long life span and enhanced specifications of clean room fabrication are fulfilled.

Figure 5A:
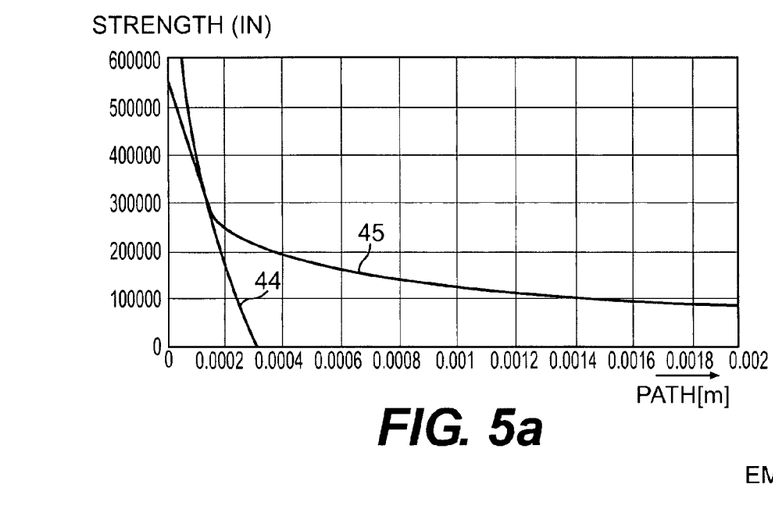
FIG. 5*a* The theoretical force graph at the end of the closing movement during build-up of the embossing force.

In FIG. 5a, the theoretical force graph at the end of the closing movement is shown by the drawn out line 45. The line 44 shows as calculation example the effective force graph over the path on both mould halves on the basis of Hooks curves of deformation of columns and plates, for a CD-closing unit with 50 mm opening path.-

Figure 5B:
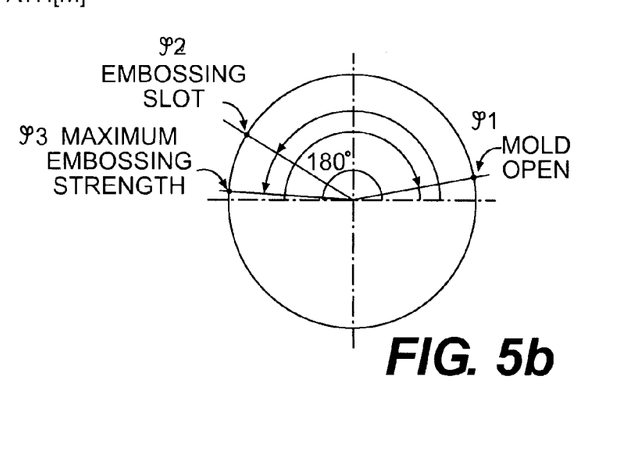
FIG. 5*b* Three positions of the eccentric or crank movement for the short stroke.

The optimum regulating target for a crank drive lies within approx. 180°, as one can see from FIG. 5b. In FIG. 5b three different positions are shown: for a rotating angle of q 1 the mould is open; the rotating angle p 2 shows the embossing slot and φ 3 the position at maximum embossing force. At the maximum embossing force, the crank can be in the dead centre position, preferably in the proximity of the dead centre: F (FIG. 4a) denotes the effective force on the deformable parts of the machine, particularly on the column 30. As a consequence of the relative movements of the both mould halves 20, 21,. one obtains. a direct change of the distance mass S. depending on local position of both tool clamping plates 22, 23. The tool clamping plate 23 moves with the function K.. F, the tool clamping plate 22 with the function X f(p). For the distance mass S, one obtains the following function:

$$S=X+K\cdot F=f(\phi)+K\cdot F$$

For the closing force regulation, kindly refer to the complete contents of the-document DE 36 31 164. This solution of the applicant shows a very advantageous method for measuring and regulating the closing force of a synthetic material injection moulding machine with central, adjustable toggle mechanism which serves the purpose of generating, the closing force. As solution it is suggested, that at least during a part of the operation time of the machine the closing force for each working cycle for an operating period, cycles, is measured and an average value is calculated from the measured values. A regulation takes place only if this average value lies in a closing force regulating zone outside a tolerance zone including the pre-given rated value of the closing force The regulation takes place in closing force variation steps, whereby for each working cycle following this variation step, a measurement takes place and the next operating period, serving the purpose of defining the average value, begins only when the measurement after a closing force variation step gives a value lying within the tolerance zone. It is further possible in an advantageous- manner to use this method during the entire operating time or only during the start-up phase or during the subsequent, normal working phase (in which thermal balance is achieved in the machine). It has thereby proved to be advantageous to select the number of working cycles per operating period of the start-up phase lower than that of operating periods of the normal working phase. Thus mostly, significantly large and time-wise quicker successive closing force variations from the rated value can be justified during the start-up phase.

Regulating error: ΔF=temperature influence

On the one hand, chance fluctuations or temperature influence is eliminated and correction on the inspection stroke is taken up as central adjustment.

Figure 6:
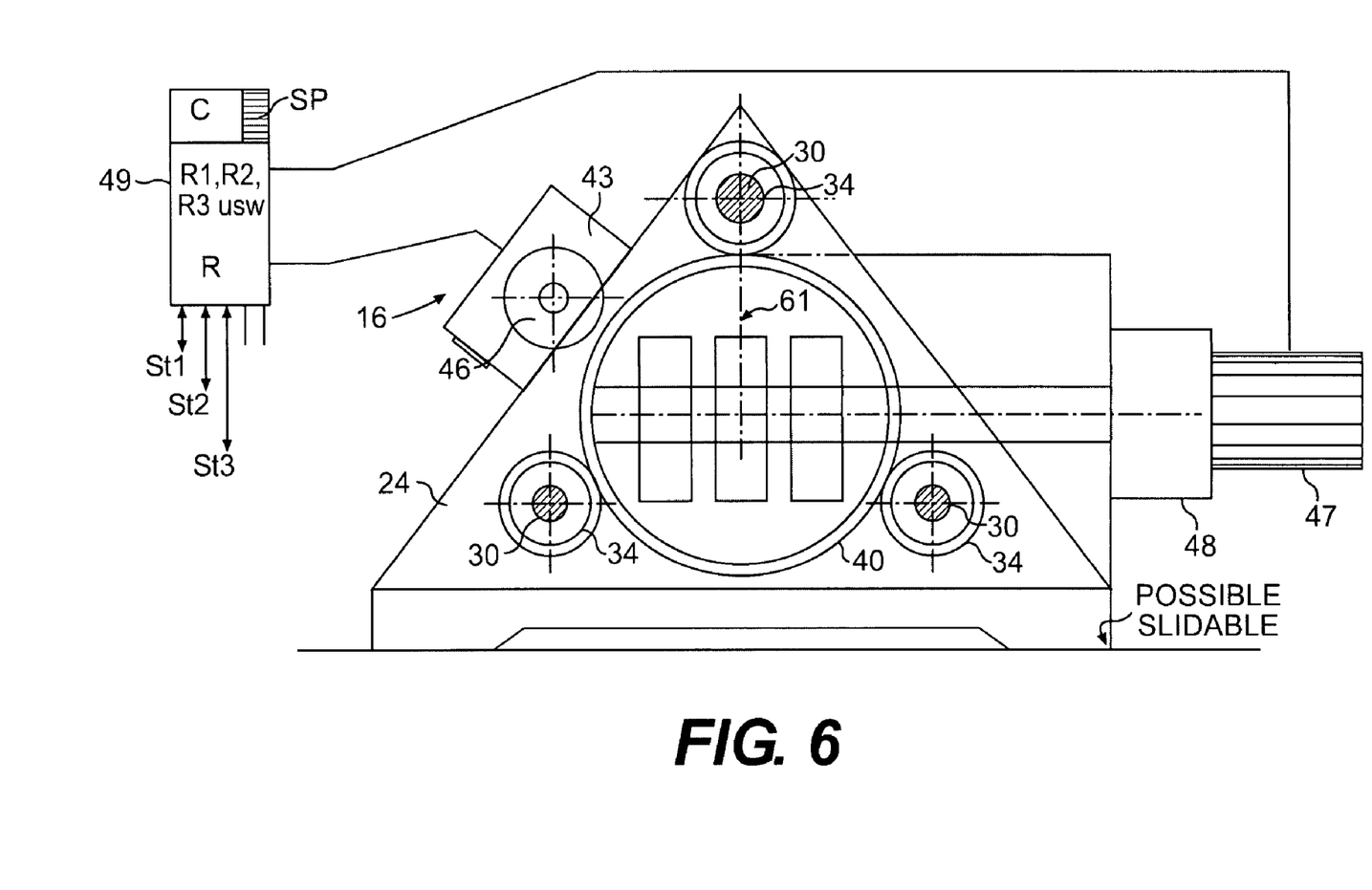
FIG. 6 Schematically, a section of a three-column machine, with the drive for short stroke and long stroke.

FIG. 6 schematically shows the central column -nut drive 16 for the long stroke with an electro motor 43 with drive pinion 46 and the drive for the short stroke through a drive motor 47, a gear 48 and the eccentric 61. The injection unit with plasticizing cylinder is allocated to the nozzle-side tool clamping plate 23, and both electromotoric drives are allocated to the other, fixed carrier plate 24. The maintenance stroke is driven by a known "mould structural height adjustment" by means of wheel rim 40 and toothed wheels 34 on to the column nuts 38. As alternative, one can realize the rotation of the column 30 with a cogged -belt. With the support of the columns 30 with roller bearings in the mould plates and with lubrication of the bearings and the adjusting thread, one can achieve higher adjusting speeds and hence retooling times during changing of the tampers 9, 9, which are lesser than 30 sec. Therefore, even for this drive a motor with precisely positionable axis, preferably a servomotor with clearance-free gear, is used. Between crank drive 25 and electrical drive motor 47 there is a gear 89, preferably a cylindrical gear. C indicates a controlling/regulating intelligence with storage, which gives or hands over the respectively required programme sequences or recipes to the corresponding motor control/regulation. In the box C, R1, R2, R3 etc. indicate, that any number of calculation performances can be directly installed on the spot and corresponding coordinations can be directly carried out. For this purpose, control connections St 1, St 2, St 3 can be foreseen and a corresponding optimization of all control and regulating processes can be ensured.

Figure 7A:
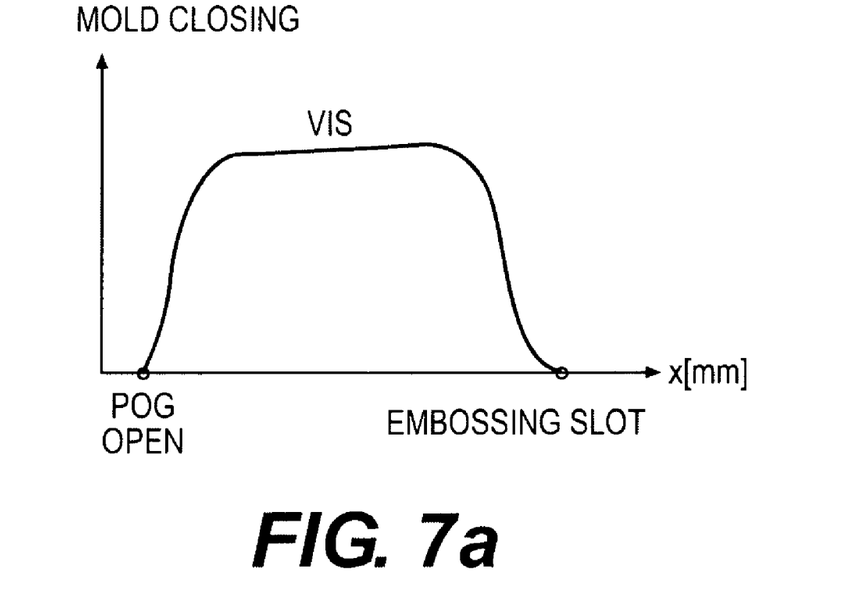
FIGS. 7a and 7b rated value graphs: the FIG. 7a for mould closing, FIG. 7b for embossing.
Figure 7B:
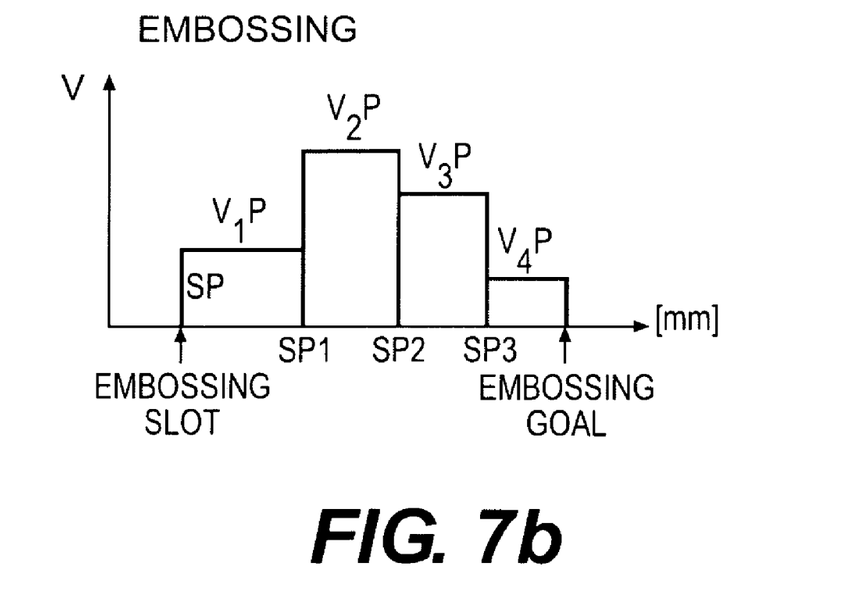
Figure 8A:
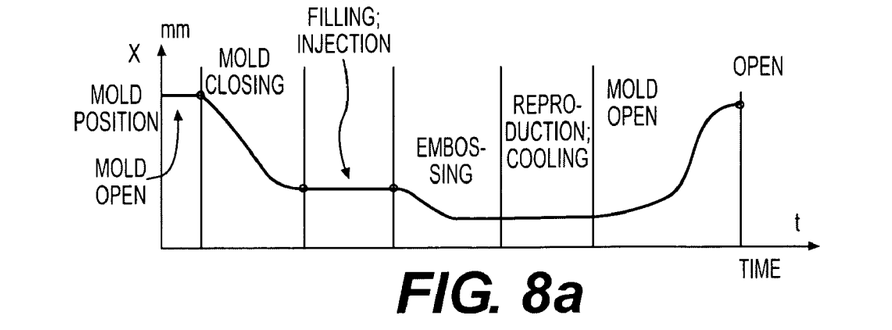
Figure 8B:
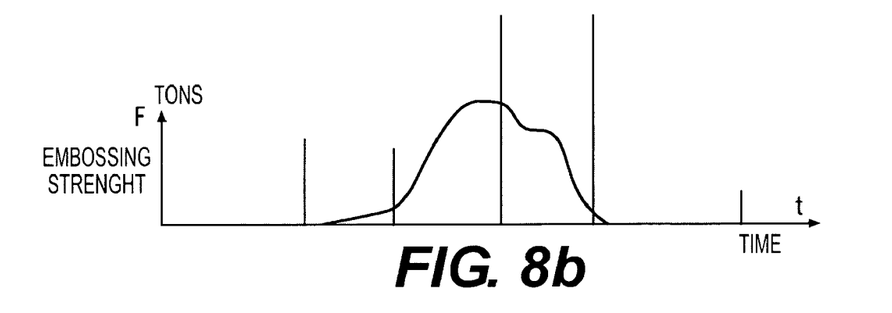
Figure 8C:
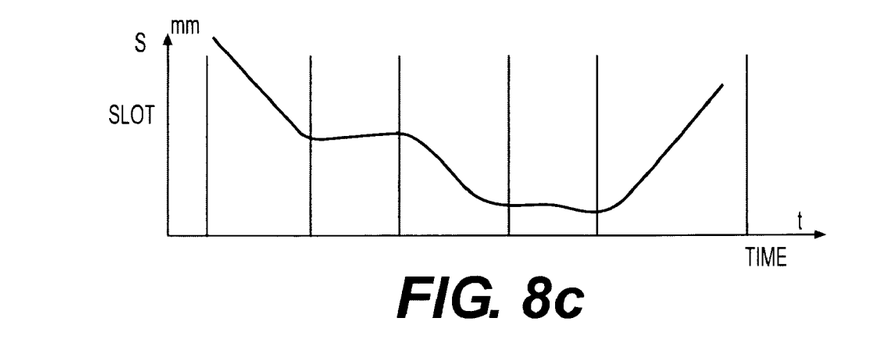
Figure 8D:
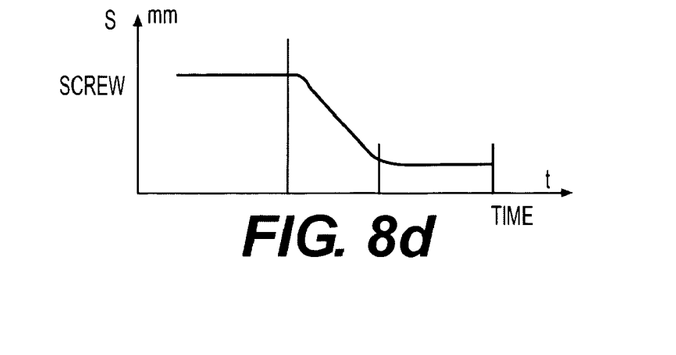

FIGS. 7a and 7b schematically show the possibility of a complete speed control/regulation, whereby FIG. 7a depicts closing of a mould and FIG. 7b depicts embossing. The term control/regulation then corresponds to the English expression control, which includes both the first mentioned terms. In both phases, a speed-profile is used over the path. SpO, Sp1, Sp2 etc. are different pre-selectable embossing slots. On the embossing target, there remains a slot of e.g. 0.02 mm.

Figure 9:
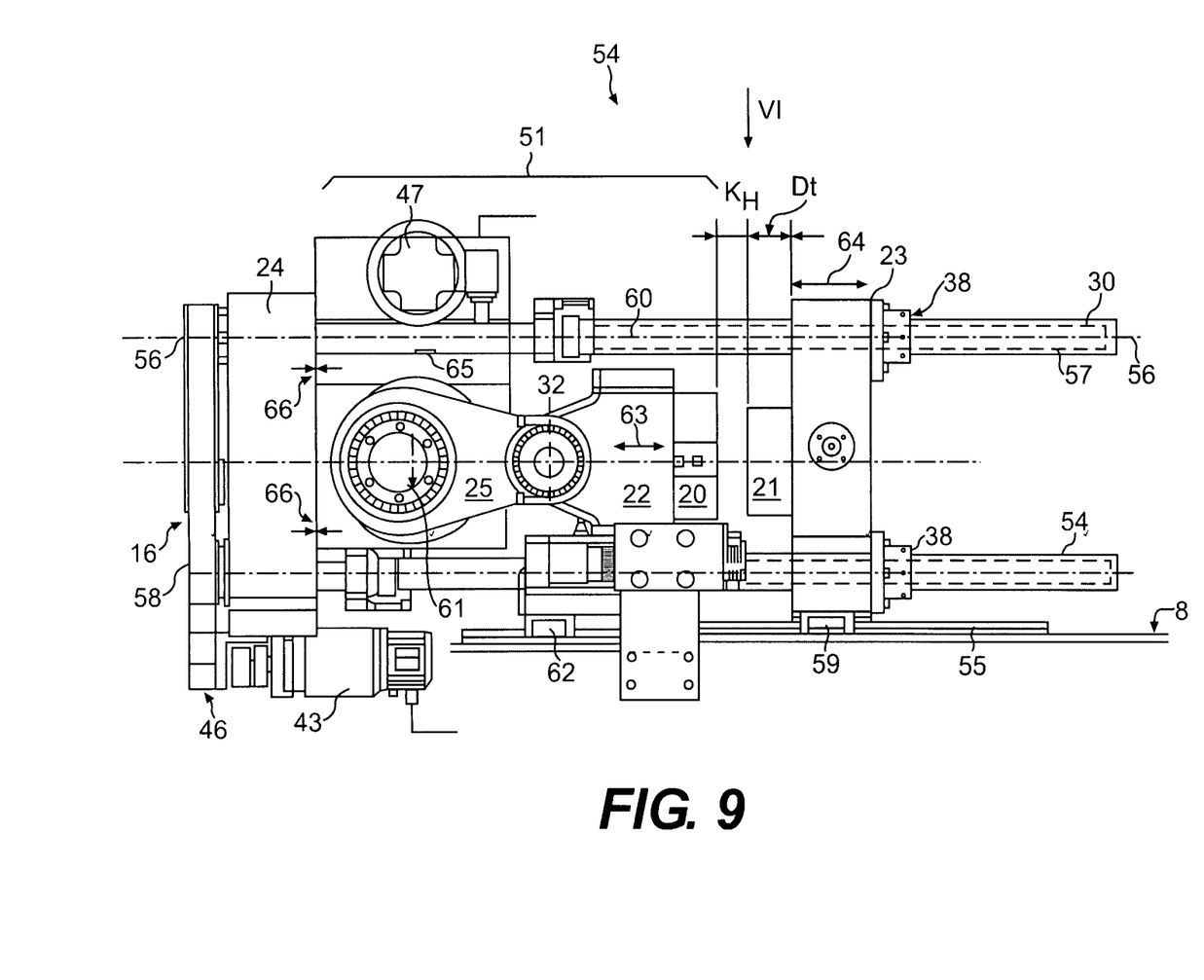
FIG. 9 A view of a preferred extension of an electrically driven injection moulding machine for production of precision parts.
Figure 10:
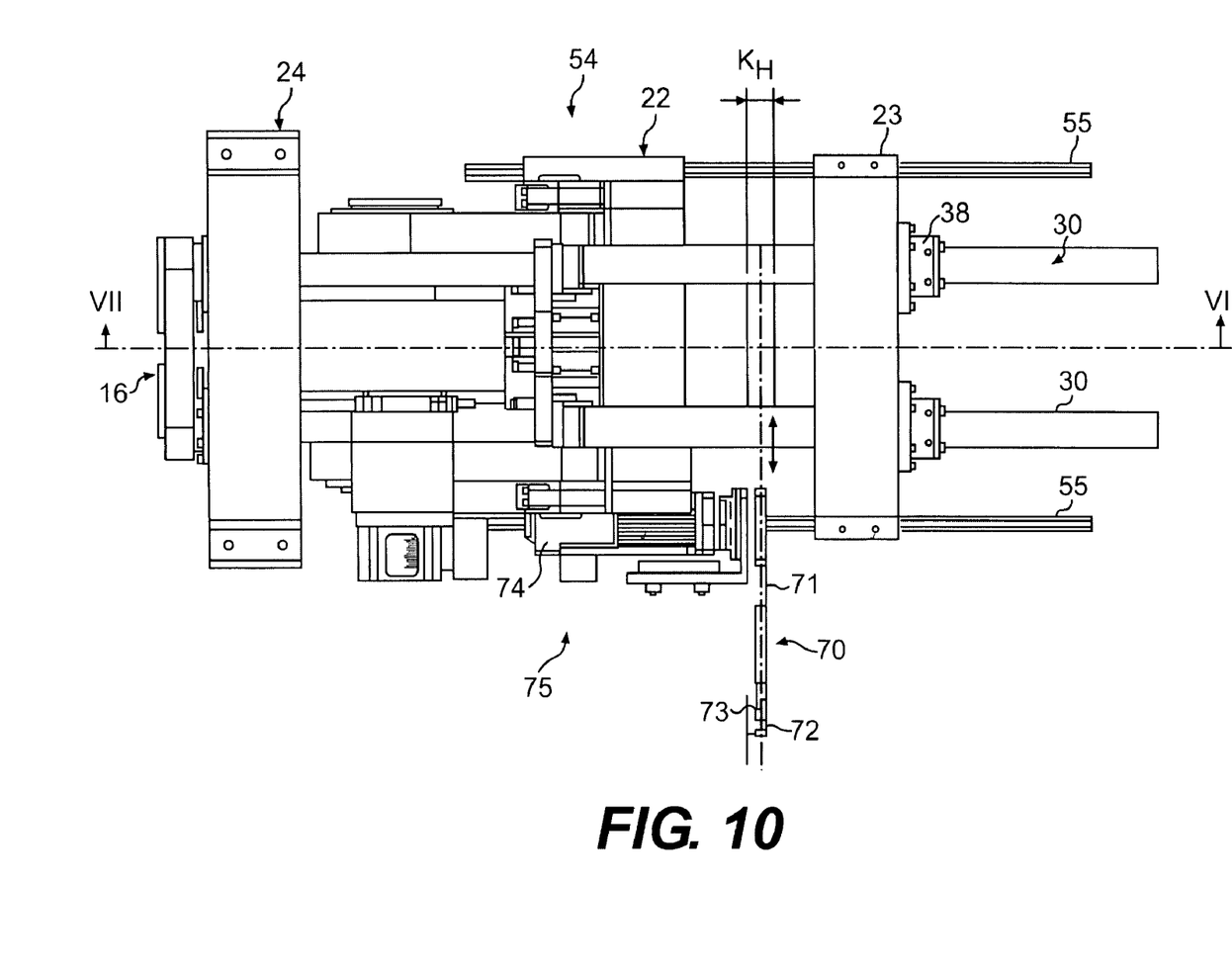
FIG. 10 A view from above, as per arrow VI of the FIG. 9.

FIGS. 8a to 8d show over time qualitatively, the graph of the most important parameters over time:
8a—the position of the mould
8b—the embossing force
8c—the slot S of the mould
8d—the path S of the screw Reference is made below to FIGS. 9 to 11, which show a view from the side or from the top, as well as a section of the mould closing 54. On, the left side of the picture there is respectively a drive carrier plate 24, on the right side of which an assembly group 51 is connected fixed for the working stroke pf short stroke directly through bolts 66. On the right half of the picture, a nozzle-side tool clamping plate 23 is arranged. The nozzle-side tool clamping plate 23 is held against the drive carrier plate 24 on one side over four columns 30 and guided downwards on a guide 55. Each of the four columns 30 is supported by a column nut 38 in the -nozzle-side tool clamping plate 23, in such a way that a rotation movement of the column axis 56 gives a longitudinal displacement of the mould half21. So that the column axis 56 with the highly precise thread, lubricated well for maximum friction elimination, does not get dirty, the column axis 56 is surrounded-by a protective sleeve 57. The rotation movement of the column axis 56 is centrally generated by a cogged belt drive 58 and a drive motor or electrical motor 43. The nozzle-side tool clamping plate 23 is guided almost clearance-free on both sides over sliding blocks 59 for a clear linear movement parallel to the axis 60 of the column axes 56; correspondingly, also the movable tool clamping plate 22 is supported over sliding block 62 for an exact parallel guiding. The eccentric 61 is freely supported, so that the crank movement of the crank drive 25 can be converted unhindered into the linear movement. By driving the nozzle-side tool clamping plate 23 by means of corresponding rotation impulse on the electrical motor 43, the mould is opened wide, e.g. to a free opening of 300 mm. The corresponding movement is indicated by arrow 63. All temperature-related tolerances are corrected by regulating the closing force. A correction thereby required is identified independently by the control (variation in closing force) and the position correction is carried out by the electro-motor 43. The actual short stroke KH is ensured solely by the eccentric movement through the crank drive 25 and the compulsive horizontal linear movement of the movable tool clamping plate 22. A further central function in the production is the CD-removal. In FIG. 10 a removing robot 70 with robot arm 71, a suction holding head 72 and a CD 73 held on it, is shown. The removal robot 70 has an own electro-motor 74 and is joined fixed to the machine bed as removal unit 75. Important thereby is a complete coordination of the movement sequence between robot arm 71 and short stroke movement (KH) for the mould opening. The coordination takes place in millisecond range and is ensured by suitable sensors, so that there is no collision of the moved parts under any circumstances.

Figure 11:
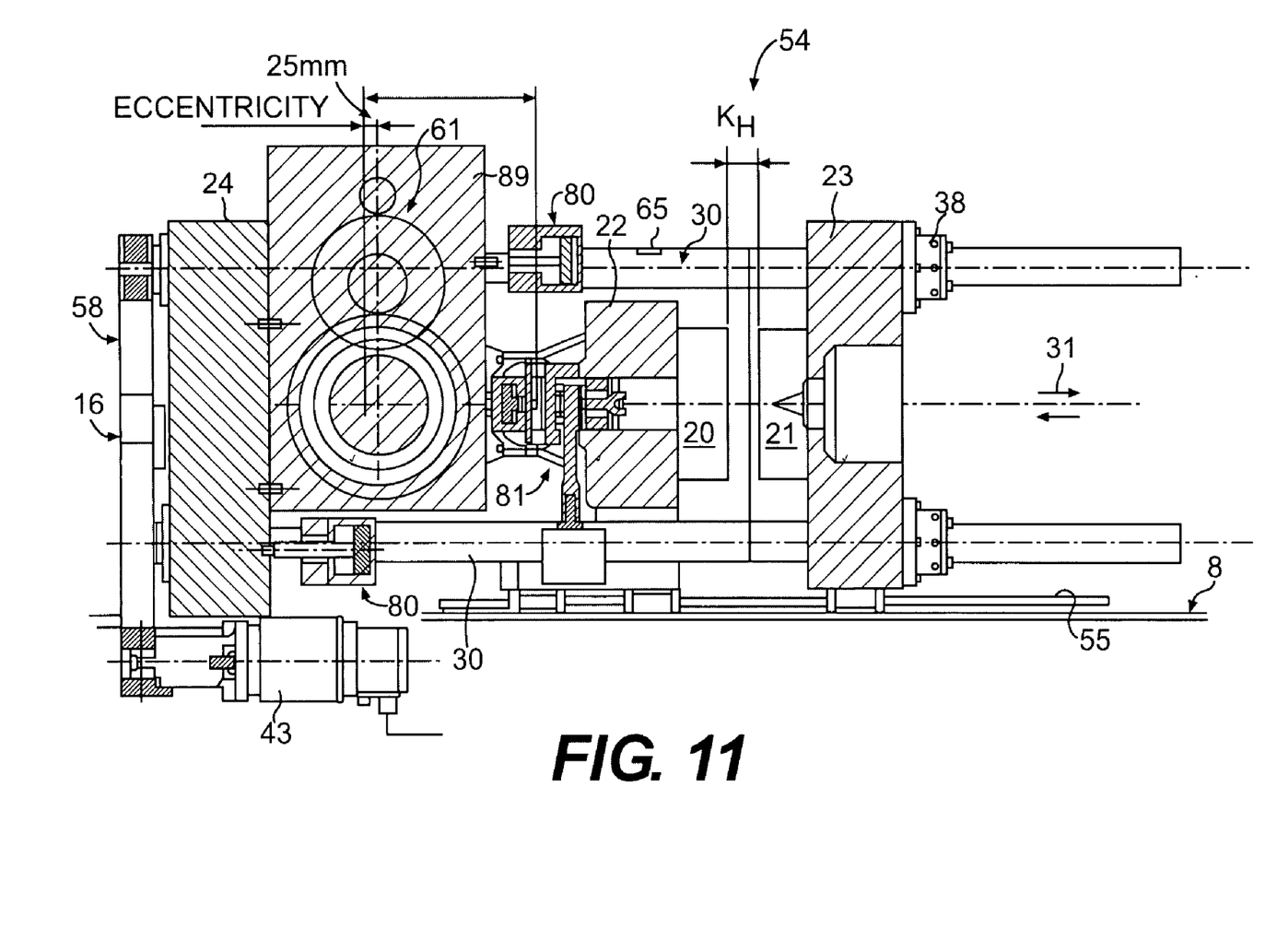
FIG. 11 A section VII—VII of the FIG. 10.

FIG. 11 shows a section VII—VII of FIG. 10. As explained above, the central column nut drive 16 is ideally used as setting member of the closing force regulation, along with. a force sensor 66 as actual value giver for determining the closing force and a regulating device. Thereby, the path identification of the stroke movements take place in the, servomotor itself. The reproducible positions are based on the control/regulation or coordination of various axes. In order to guarantee the required precision after adjustment of the maintenance stroke, with the help of a feed device 80 in each of the driven columns 30, the machine-structural required support clearance and thread clearance is eliminated. The required pressing for clearance elimination can take place through springs or pneumatically and effects with the help of a compression force between the drive carrier plate 24 and the long stroke carrier plate 23, to achieve that the clearance at the force-closing flank is eliminated. With the eccentric 61, as example, the eccentric radius is denoted by 25 mm, which would allow a total short stroke of 50 mm.

The ejecting device 81 is not dealt with in details. This could, for example, be designed with pneumatic activation and correspond to the solution of the state-of-the-art technology.

I claim:

1. A method of controlling and/or regulating an embossing process for producing a precision part, comprising:
    providing an injection moulding machine having a driven mould half, a counter-mould half, and a column;
    setting the injection moulding machine to a basic setting;
    injecting a mass into an embossing slot during an injection cycle, wherein the embossing slot is defined by the driven mould half and the counter mould half;
    moving the driven mould half via an electro-mechanical or hydraulic embossing drive relative to the counter-mould half;
    controlling and/or regulating the embossing force on the mass by controlling and/or regulating a path of the driven mould half; and
    preventing the driven mould half from physically contacting the counter-mould half during the embossing process,
    wherein the column expands as a function of an embossing force applied to the mass in the embossing slot during the embossing process,
    wherein the expansion of the column influences the mass in the embossing slot,
    wherein the controlling and/or regulating includes compensating for changes in the movement of the driven mould half due to the expansion of the column.

2. The method of claim 1, further comprising reducing a size of the embossing slot; and
    increasing the embossing force applied to the mass in the embossing slot,
    wherein the path during the reduction of the embossing slot or the injection of the mass into the embossing slot, as well as during the increase in the embossing force, is measured substantially simultaneously with the control and/or regulation of the movement of the driven mould half.

3. The method of claim 1, further comprising reducing a size of the embossing slot; and
    increasing the embossing force applied to the mass in the embossing slot,
    wherein the reduction of the size of the embossing slot and the increase in the embossing force takes place in a speed-regulated manner.

4. The method of claim 1, further comprising reducing a size of the embossing slot; and
    increasing the embossing force applied to the mass in the embossing slot,
    wherein the reduction of the size of the embossing slot and the increase in the embossing force, both by controlling and/or regulating a speed of the driven mould half, is executed simultaneously.

5. The method of claim 1, wherein an embossing end of the driven mould half applies the embossing force to the mass based on a pre-selectable path position of the driven mould half or the embossing drive,
    wherein the pre-selectable path position takes into account a pre-settable embossing force and an optimum embossing force between the driven mould half and the counter-mould half.

6. The method of claim 5, wherein the pre-settable embossing force and the quantity of mass is selected such that during the movement of the driven mould half as well as subsequent to the movement of the driven mould half, substantially all of the embossing force is taken up by the mass and there is substantially no physical contact between the driven mould half and the counter mould half.

7. The method of claim 1, further comprising a post-pressure sequence subsequent to the moving of the driven mould half,
    wherein the post-pressure sequence includes cooling the mass so as to form the precision part;
    wherein the post-pressure sequence takes place in a -controlled/regulated manner,
    wherein a profile of the control and/or regulation of the post-pressure sequence is defined using at least one of the path over time, the embossing force over time, or a torque applied by the electro-mechanical or hydraulic embossing drive over time,
    wherein the profile is defined in such a way that a surface structure of the mass is substantially retained between an end of the moving of the driven mould half and an end of the post pressure sequence,
    wherein the pressure on the mass during the post-pressure sequence is reduced in such a way that an inner tension condition of the precision part, including the refractive index of the precision part, is maintained during the post-pressure sequence.

8. The method of claim 1, wherein the basic setting of the injection moulding machine corresponds to at least one of a maximum embossing force of the embossing process, a basic closing force of the embossing process, and an optimum end and beginning position of the electro-mechanical or hydraulic embossing drive without the precision part and with the driven mould half and counter mould half completely closed.

9. The method of claim 1, wherein for each production of a precision part, a peak value of the embossing force that actually occurred is determined, and corresponding length variations of the column caused by thermal influences are determined by calculating an average value of several peak values and then adjusting the average value based on a setting of a column nut associated with the column.

10. The method of claim 1, wherein the electro-mechanical or hydraulic embossing drive is an electro-mechanical servomotor including a position identification,
    wherein the path is calculated based on the position identification.

11. The method of claim 1, wherein the setting includes adjusting a column nut associated with the column via an electro-mechanical motor so as to establish an optimum end position for the driven mould half.

12. The method of claim 1, wherein a path identification for a long stroke or an inspection stroke occurs via a path identification of a servomotor,
    wherein subsequent to positioning at least one of the driven mold half and the counter mold half via the long stroke or the inspection stroke, the controlling and/or regulating is substantially reproducible so as to produce substantially identical precision parts.

13. The method of claim 1, wherein the precision parts include flat data carriers.

14. The method of claim 1, wherein the controlling and/or regulating the embossing force on the mass is performed without continuously measuring with the embossing slot.

15. An injection moulding machine for implementing an embossing process to produce precision parts, comprising:
    a driven mould half defining a first portion of an embossing slot;
    a counter-mould half defining a second portion of the embossing slot;

an injector configured to inject a mass into the embossing slot;

an electro-mechanical or hydraulic embossing drive configured to move the driven mould half relative to the counter mould half so as to generate an embossing force between the driven mould half and the counter-mould half;

a column configured to expand due to the embossing force; and a controller configured to control and/or regulate the embossing force on the mass by controlling and/or regulating a path of the driven mould half, the controller taking into account the expansion of the column, wherein the expansion of the column influences the mass disposed in the embossing slot, wherein the machine is configured to prevent the driven mould half from physically contacting the counter-mould half during the embossing process.

16. The injection moulding machine of claim 15, wherein the embossing drive includes at least one of a toggle drive, a draw rod drive, an eccentric drive, and a crank drive;

wherein the at least one of the toggle drive, the draw rod drive, the eccentric drive, and the crank drive is connected to the driven mould half.

17. The injection moulding machine of claim 15, further comprising a drive carrier plate, wherein the driven mould half is movable relative to the drive carrier plate such that the movement of the driven mould half does not substantially affect an ability of the driven mould half to return to a precise starting position.

18. The injection moulding machine of claim 15, wherein the embossing drive is at least one of an eccentric drive and a crank drive, wherein the at least one of the eccentric drive and the crank drive are arranged such that a maximum embossing force occurs proximate of a dead centre of the driven mould half and the counter-mould half.

19. The injection moulding machine of claim 15, wherein the embossing drive is at least one of an eccentric drive and a crank drive, wherein the path of the driven mould half is derived from a position of the at least one of the eccentric drive and the crank drive and is calculated based on a position identification from the control and/or regulation of the embossing drive.

20. The injection moulding machine of claim 16, further comprising:

a column nut drive configured to implement a basic setting of the injection moulding machine; and a counter plate configured to allow the counter-mould half to be movable relative to a machine stand.

21. The injection moulding machine of claim 20, further comprising:

a central column nut drive configured to be a setting member for the basic setting; and a force sensor configured to calculate the embossing force.

22. The injection moulding machine of claim 15, further comprising at least one of a mechanical spring and a pneumatic spring configured to press portions of the injection moulding machine in a direction of the embossing force so as to substantially eliminate spaces between the portions of the injection moulding machine.

23. The injection moulding machine of claim 20, further comprising:

a first independently controllable drive motor associated with the embossing drive; and a second independently controllable drive motor associated with the column nut drive, wherein the controller is configured to control and/or regulate each of the first independently controllable drive motor and the second independently controllable drive motor, wherein the controller includes memory configured to store at least one of selected settings and programmes.

24. The injection moulding machine of claim 15, wherein the precision parts include flat data carriers.

25. The injection moulding machine of claim 15, wherein the controller is configured to control and/or regulate the embossing force on the mass without continuously measuring with the embossing slot.

* * * * *